United States Patent
Hill, Jr. et al.

(10) Patent No.: US 10,723,930 B2
(45) Date of Patent: Jul. 28, 2020

(54) VISCOELASTIC FLUID COMPOSITIONS, OIL FLOWABLE/OIL DISPERSION COMPOSITIONS, AND DRILLING FLUID COMPOSITIONS

(71) Applicant: ExxonMobil Chemical Patents Inc., Baytown, TX (US)

(72) Inventors: Ronald R. Hill, Jr., Humble, TX (US); Syd R. Wright, St. Pierre (BE); Yang Yang, Kingwood, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 141 days.

(21) Appl. No.: 15/752,351

(22) PCT Filed: Aug. 8, 2016

(86) PCT No.: PCT/US2016/045961
§ 371 (c)(1),
(2) Date: Feb. 13, 2018

(87) PCT Pub. No.: WO2017/039960
PCT Pub. Date: Mar. 9, 2017

(65) Prior Publication Data
US 2019/0040294 A1 Feb. 7, 2019

Related U.S. Application Data

(60) Provisional application No. 62/211,223, filed on Aug. 28, 2015.

(30) Foreign Application Priority Data
Oct. 30, 2015 (EP) .................................. 15192281

(51) Int. Cl.
*C09K 8/035* (2006.01)
*A01N 25/02* (2006.01)
(Continued)

(52) U.S. Cl.
CPC .............. *C09K 8/035* (2013.01); *A01N 25/02* (2013.01); *A01N 25/04* (2013.01); *A01N 25/10* (2013.01);
(Continued)

(58) Field of Classification Search
CPC . C09K 8/035; C09K 8/32; C09K 8/34; C09K 8/882; C09K 2208/30
See application file for complete search history.

(56) References Cited

U.S. PATENT DOCUMENTS 5,639,465 A * 6/1997 Huang .................. A01N 25/12
424/405
6,464,996 B1 10/2002 Kowalik et al.
(Continued)

FOREIGN PATENT DOCUMENTS

WO 2006/053577 A 5/2006
WO 2012/167322 A 12/2012

OTHER PUBLICATIONS

Safety data sheet of EXXSOL Isobar fluid. Exxon Mobile, Dec. 2018 (Year: 2018).*
PCT/US2016/045961, ISR/WO dated Aug. 8, 2016, pp. 1-10.

*Primary Examiner* — Aiqun Li

(57) ABSTRACT

Viscoelastic fluid compositions are provided that have improved properties for suspending particulate active ingredients. Methods for forming the compositions are also provided. The compositions preferably have a non-Newtonian behavior, so that the viscosity of the composition at low shear rates is suitable for keeping solid particles in the form of a stable suspension while also providing a reduced viscosity at higher shear rates (such as a substantially reduced or minimized viscosity) to allow for pumping, tank mixing, and/or distribution of the composition, for instance by spraying.

15 Claims, 5 Drawing Sheets

(51) Int. Cl.
  *A01N 25/04*  (2006.01)
  *A01N 25/10*  (2006.01)
  *A01N 27/00*  (2006.01)
  *A01N 25/30*  (2006.01)
  *C09K 8/32*  (2006.01)
  *C09K 8/34*  (2006.01)
  *C09K 8/88*  (2006.01)

(52) U.S. Cl.
  CPC .............. *A01N 25/30* (2013.01); *A01N 27/00* (2013.01); *C09K 8/32* (2013.01); *C09K 8/34* (2013.01); *C09K 8/882* (2013.01); *C09K 2208/30* (2013.01)

(56) References Cited

U.S. PATENT DOCUMENTS

| | | |
|---|---|---|
| 6,664,213 B1 | 12/2003 | Furusawa et al. |
| 2005/0130853 A1* | 6/2005 | Mishra ................ C10M 161/00 508/291 |
| 2007/0298985 A1* | 12/2007 | Poirier ............... C10M 171/004 508/451 |
| 2008/0318812 A1 | 12/2008 | Kakadjian, Sr. et al. |
| 2013/0345059 A1 | 12/2013 | Kostansek et al. |
| 2014/0305651 A1 | 10/2014 | Hill, Jr. et al. |

* cited by examiner

VISCOELASTIC FLUID COMPOSITIONS, OIL FLOWABLE/OIL DISPERSION COMPOSITIONS, AND DRILLING FLUID COMPOSITIONS

CROSS REFERENCE TO RELATED APPLICATIONS

This application is a U.S. National Stage Application of PCT Application Serial No. PCT/US2016/045961 filed Aug. 8, 2016, and claims the benefit of U.S. Provisional Application No. 62/211,223, filed Aug. 28, 2015 and EP 15192281.2 filed Oct. 30, 2015, the disclosures of which are incorporated herein by reference in their entireties.

FIELD

This disclosure provides viscoelastic fluid compositions, oil flowable or oil dispersion compositions comprising the same, and methods for preparing the same.

BACKGROUND

There is a need to formulate agricultural chemicals, including pesticides in non-aqueous concentrates that can be applied directly, and/or readily diluted and dispersed to application concentrations in water, preferably in a sprayable form. As conventionally understood, the term pesticide is inclusive of insecticides, herbicides, fungicides, and other active ingredients. When the pesticide active ingredient is soluble in, for example, a hydrocarbon fluid, an emulsifiable concentrate solution can be made by combining suitable surfactants with the hydrocarbon fluid and active ingredient. When the active ingredient is not soluble in a typical organic fluid and/or not soluble in and/or chemically stable in water, an alternative approach is needed.

The oil flowable or oil dispersion approach involves suspending pesticide active ingredient particles in an organic fluid, typically in an organic fluid/surfactant solution. A major limitation for such oil flowable, oil dispersion, or oil-miscible flowable concentrate compositions, is the need to physically stabilize the formulation for potentially long periods of storage, so that it can be in a consistently useable form for a later end use. For the particles to remain suspended and not settle to the bottoms of their containers, the formulation viscosity before active ingredients are added generally must be about 1000 cP. This could be achieved with viscous hydrocarbon oils; however, most viscous hydrocarbon oils are phytotoxic. Consequently, one would prefer to use lower viscosity organic fluids that are not deleterious to the plant and to thicken or viscosify the fluids to a suitable viscosity with a thickening agent. Common thickening agents for organic fluids that could be used include soluble polymers such as polyisobutylene and network or structure forming compounds such as fumed silicas, clays, and materials that are crystalline or semi-crystalline in the fluid at application temperature, but soluble in the fluid at an elevated temperature to allow for initial formulation. While all these agents can thicken organic fluids, many are not compatible with the surfactants needed to disperse the concentrate in water.

U.S. Patent Application Publication 2013/0345059 describes oil formulations with thickeners such as cellulose-based thickeners or polymeric thickeners. Thickeners are described for use in oil formulations to provide formulations with increased viscosity. This is described as being beneficial for allowing particles to remain suspended in the oil formulations. However, there is an ongoing need for improved oil flowable or oil dispersion compositions with favorable properties, particularly for agricultural purposes.

There is also a need for improved drilling muds or drilling fluids for oil and gas operations. Drilling muds are used in the process of drilling boreholes in subterranean deposits for gas and/or oil production. The boring is accomplished by well drilling tools and a drilling fluid. Drilling muds serve to cool and lubricate the drill bits, to carry the cuttings to the surface as the drilling fluid is circulated in and out of the well, to support at least part of the weight of the drilling pipe and drill bit, to provide a hydrostatic pressure head to prevent caving in of the walls of the well bore, to deposit on the surface of the well bore a filter cake which acts as a thin, semi-pervious layer to prevent undue passage therethrough of drilling muds, and to perform other functions as are well-known in the drilling art. It is important that the drilling fluid exhibit a relatively low rate of filtration or fluid loss in addition to having desirable rheological properties, such as non-Newtonian or shear thinning behavior. Conventional drilling muds use organophillic clays to viscosify base fluids and achieve the desired shear thinning behavior. However, it is desirable to develop drilling muds that minimize or avoid the use of organophillic clays.

SUMMARY

The present invention is directed to viscoelastic fluid compositions having improved properties, in particular to viscoelastic fluid compositions that show an improved stability when a solid particulate ingredient such as a pesticide active ingredient, is added thereto to prepare an oil flowable or oil dispersion composition. As a result of the improved stability of the oil flowable or oil dispersion composition, the solid particulate ingredient is maintained in suspension in the suspension medium and settling is limited or avoided. Especially suitable solid particulate ingredients contemplated in the present invention include pesticide active ingredient particles. Especially suitable oil flowable or oil dispersion compositions according to the present invention include a pesticide active ingredient suspended in said viscoelastic fluid composition for use in the agricultural chemicals field.

The viscoelastic fluid compositions of the present invention are also useful as drilling muds or drilling fluids. The improved stability of the viscoelastic fluid compositions allows better performance in drilling operations, maintaining the suspension of cuttings in the borehole as the cuttings are brought to the surface or when circulation in the borehole is temporarily ceased. Other potential, but non-limiting, applications for the viscoelastic fluid compositions of the present invention include consumer products, such as household insecticides, fragrances, and water absorbent materials, freshness maintenance for fruit or flowers, and coatings.

The viscoelastic fluid compositions of the present invention and the oil flowable or oil dispersion compositions comprising the same preferably have non-Newtonian or shear thinning behavior, so that the viscosity of the composition at low shear rates is suitable for keeping solid particles of agricultural pesticides in the form of a stable suspension while also providing a reduced viscosity at higher shear rates (such as a substantially reduced or minimized viscosity) to allow for pumping, tank mixing, and/or distribution of the composition, for instance by spraying. Shear thinning behavior for drilling fluids provides higher viscosity at lower shear rates in the borehole annulus to support the transport of cuttings, but lower viscosity at high shear rate conditions near the drill bit to allow faster drilling.

The viscoelastic fluid composition of the present invention comprises a hydrocarbon fluid having a total paraffinic hydrocarbon content of at least about 80 wt % relative to the weight of the hydrocarbon fluid and an aromatic content of less than about 20 wt % relative to the weight of the hydrocarbon fluid. The total paraffinic hydrocarbon content is the sum of the n-paraffins, isoparaffins and cycloparaffins contents. The hydrocarbon fluid has an initial boiling point of about 95° C. to about 280° C. and a final boiling point of about 100° C. to about 315° C. The fluid composition further comprises about 1.0 wt % to about 10.0 wt %, relative to the weight of the hydrocarbon fluid, of a thickening agent comprising a block copolymer having a peak molecular weight of about 10,000 g/mol to about 500,000 g/mol. At least one end block of the block copolymer comprises an aromatic polymer, the weight of said at least one end block being about 20 wt % to about 50 wt % of the block copolymer.

In one embodiment, the hydrocarbon fluid of the viscoelastic fluid composition has an isoparaffin content of less than about 50 wt % relative to the weight of the hydrocarbon fluid, a n-paraffin content of less than about 50 wt % relative to the weight of the hydrocarbon fluid, a cycloparaffin content of at least than about 25 wt % relative to the weight of the hydrocarbon fluid, and an aromatic content of less than about 20 wt % relative to the weight of the hydrocarbon fluid. The hydrocarbon fluid has an initial boiling point of about 160° C. to about 280° C. and a final boiling point of about 195° C. to about 315° C. The fluid composition further comprises about 1.0 wt % to about 10.0 wt %, relative to the weight of the hydrocarbon fluid, of a thickening agent comprising a block copolymer having a peak molecular weight of about 30,000 g/mol to about 300,000 g/mol. At least one end block of the block copolymer comprises an aromatic polymer, the weight of said at least one end block being about 20 wt % to about 50 wt % of the block copolymer.

In another embodiment, the hydrocarbon fluid of the viscoelastic fluid composition has an isoparaffin content of at least 50 wt % relative to the weight of the hydrocarbon fluid and an aromatic content of less than about 20 wt % relative to the weight of the hydrocarbon fluid. Preferably, the hydrocarbon fluid has isoparaffin content of at least 90 wt % relative to the weight of the hydrocarbon fluid. The hydrocarbon fluid has an initial boiling point of about 95° C. to about 270° C. and a final boiling point of about 100° C. to about 310° C. The fluid composition further comprises about 1.0 wt % to about 10.0 wt %, relative to the weight of the hydrocarbon fluid, of a thickening agent comprising a block copolymer having a peak molecular weight of about 30,000 g/mol to about 300,000 g/mol. At least one end block of the block copolymer comprises an aromatic polymer, the weight of said at least one end block being about 20 wt % to about 50 wt % of the block copolymer.

In a further embodiment, the present invention relates to oil flowable or oil dispersion compositions comprising at least said viscoelastic fluid composition and a pesticide active ingredient in the form of solid particles.

DETAILED DESCRIPTION

Figure 1:
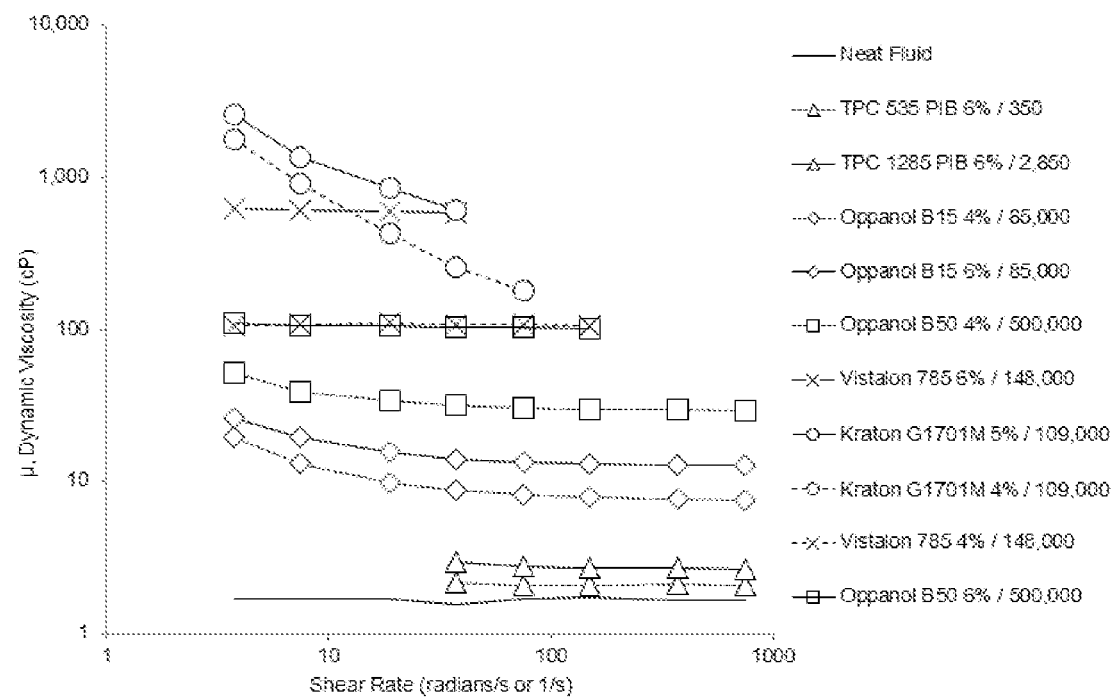
FIG. 1 shows viscosities as a function of shear rate for compositions containing various thickening agents.

In various aspects of the present invention, viscoelastic fluid compositions are provided that have improved properties, in particular viscoelastic fluid compositions that show an improved stability when a solid particulate active ingredient such as a pesticide active ingredient in the form of solid particles, is added thereto to prepare an oil flowable or oil dispersion composition. Methods for forming the viscoelastic fluid compositions and oil flowable or oil dispersion compositions comprising the same are also provided. The viscoelastic fluid compositions and the oil flowable or oil dispersion compositions comprising the same preferably have non-Newtonian behavior, so that the viscosity of the composition at low shear rates is suitable for keeping the solid particles in the form of a stable suspension while also providing a reduced viscosity at higher shear rates (such as a substantially reduced or minimized viscosity) to allow for pumping, tank mixing, and/or distribution of the composition, for instance by spraying.

In the present disclosure, an "oil flowable composition", also called oil dispersion or oil-based suspension concentrate or OD, is a stable suspension of active ingredient(s) in an organic fluid. Oil flowable or oil dispersion compositions are typically used in agricultural applications where the solid particulate active ingredient is a pesticide active ingredient in the form of solid particles. The oil flowable or oil dispersion composition may contain other dissolved active ingredient(s) and any further suitable additives. The oil flowable or oil dispersion composition is typically intended for dilution with water before use.

In the present disclosure, the suspension medium of such oil flowable or oil dispersion compositions is a viscoelastic fluid composition. By "viscoelastic fluid composition" is meant a fluid composition for which the relationship between stress and strain depends on time. The viscoelastic fluid compositions and the oil flowable or oil dispersion compositions comprising the same preferably have a non-Newtonian behavior so that the viscosity of the composition decreases when the shear rate increases. As used herein, a composition is considered to be "fluid" at the observation temperature if it flows when the bottle is inclined or tilted at 180°, optionally under or after an applied shear stress. In the present invention, a "fluid composition" is a composition that is nearly incompressible. Solid and gas compositions are not contemplated in the present application.

The viscoelastic fluid composition of the present invention includes a hydrocarbon fluid and a thickening agent. The combination of the hydrocarbon fluid and the thickening agent can allow the viscoelastic fluid composition of the present invention to behave in a non-Newtonian manner with respect to changes in the viscosity of the composition as a function of shear. The viscoelastic fluid composition can optionally also include other components found in compositions for suspending particles. For example, in applications related to agricultural use, such as using the viscoelastic fluid composition of the present invention to suspend a pesticide active ingredient particle and form an oil flowable or oil dispersion composition, the oil flowable or oil dispersion composition can optionally further include one or more additional thickening agents, one or more surfactants, water, and/or other dissolved active ingredient(s) as well as further suitable additives in addition to the particles comprising the active ingredient(s). In oil and gas applications, such as drilling muds, the viscoelastic fluid compositions may be combined with one or more additional thickening agents, one or more surfactants, water, and/or weighting agents to produce the drilling mud.

In an agricultural use, such as in an oil flowable or oil dispersion composition comprising the viscoelastic fluid composition as a suspension medium and particles containing a pesticide active ingredient, it can be desirable for the suspension medium to have a sufficient viscosity so that the particles containing the active ingredient remain suspended for a long period of time without settling. For example, it can be desirable to have a sufficient viscosity to allow particles to remain suspended on a time scale of weeks, or possibly even months, without settling to the bottom and/or rising to the top of a container or vessel.

Active ingredients suitable for inclusion in an oil flowable or oil dispersion composition for instance comprise at least one fungicide, insecticide, herbicide, plant growth regulator, miticide, nematocide, molluscicide, algicide or other pesticide or mixtures thereof in the form of solid particles. By the term "solid particles", it is meant that the particles are partially or fully made of material that is in the solid state. In general, the particles have a melting point greater than 50° C. It is also desirable that the particles have a low solubility in the hydrocarbon fluid, such as less than 1 wt %. The particles may or may not be porous or may or may not have one or more void or cavity, and each void or cavity, if present, may or may not be partially or fully occupied by material that is solid, liquid or gas. The size of the particles in this type of suspension can vary, but typically is on the order of μm. For example, the particles suspended in the suspension medium can have a median particle size of about 0.1 μm to 100 μm, such as a median particle size of about 0.1 μm to 50 μm, or of about 0.5 μm to 20 μm, for instance of about 1 to 15 μm. In the present disclosure, the median particle size is the median value of the largest dimension of the particle, that is, half of the particles, by weight, have a largest dimension that is larger than the median value. The median particle size may be determined by optical microscopy and assessed by eye, possibly with reference to length standards, or alternatively the images may be inspected and assessed by appropriate image analysis methods such as computer programs. In order to maintain a suspension of such particles, the dynamic viscosity of the suspension medium is preferably at least about 1000 cP, or at least about 2500 cP, or at least about 5000 cP at temperatures between about 0° C. and about 70° C. and at a shear rate of 0.1 $s^{-1}$, preferably at a shear rate of about 1.0 $s^{-1}$. The pesticide active ingredient particles are typically added to the oil flowable or oil dispersion composition in an amount from about 5 to about 90 wt % based on the weight of the oil flowable or oil dispersion composition, such as from about 10 to about 80 wt %.

The present invention therefore also relates to an oil flowable or oil dispersion composition comprising at least the viscoelastic fluid composition of the present invention and a pesticide active ingredient in the form of solid particles. Such an oil flowable or oil dispersion composition, especially an oil flowable or oil dispersion composition having improved stability properties, can be formed by dispersing the pesticide active ingredient particles in the viscoelastic fluid composition of the present invention, optionally in the presence of further suitable additive components.

Hydrocarbon Fluid

In various aspects of the present invention, the viscoelastic fluid composition comprises a hydrocarbon fluid having one or more desirable properties. Hydrocarbons are defined as compounds containing only carbon and hydrogen. In this discussion, the viscoelastic fluid composition typically comprises, prior to mixing with active ingredients (such as agricultural pesticide solid particles) and/or adjuvants different from the hydrocarbon fluid and the thickening agent (such as surfactants), at least about 90 wt %, or at least about 95 wt %, and preferably at least 98 wt %, of a hydrocarbon fluid. The hydrocarbon fluid in the viscoelastic fluid composition can be provided in any convenient manner. For example, the hydrocarbon fluid can correspond to a single (optionally commercially available) hydrocarbon fluid, or the hydrocarbon fluid can correspond to a mixture of hydrocarbons and/or hydrocarbon fluids (i.e., a plurality of hydrocarbon fluids) that are combined to form the hydrocarbon fluid in the viscoelastic fluid composition.

In the present invention, the hydrocarbon fluid has a total paraffinic hydrocarbon content of at least about 80 wt % relative to the weight of the hydrocarbon fluid, preferably at least about 85 wt %, more preferably at least about 90 wt %, and ideally at least about 95 wt %. In the present disclosure, the total paraffinic hydrocarbon content is the sum of the n-paraffins, isoparaffins and cycloparaffins contents and can be measured by a method based on ASTM D2425, ASTM D2786 and/or ASTM D2789. The hydrocarbon fluid can be substantially composed of linear or normal paraffins (n-paraffins), branched paraffins (isoparaffins), and/or cycloparaffins. In aspects where two or more of n-paraffins, isoparaffins, and cycloparaffins are present in the hydrocarbon fluid, the two or more of the n-paraffins, isoparaffins, and/or cycloparaffins can be present in any convenient ratio. The one or more desirable properties for a hydrocarbon fluid (or fluids) used to form a viscoelastic fluid composition can include, but are not limited to, a desirable aromatic content, a desirable content of n-paraffins, isoparaffins and/or cycloparaffins, and/or a desirable boiling range.

The aromatic content may be determined based on method AM-S 140.31, in which the aromatic content of hydrocarbon products in the range 25-340° C. is calculated from the baseline absorbance of the peak produced by the sample in the 260 to 280-nm region in a UV spectrophotometer.

One type of characterization for a hydrocarbon fluid used to form a viscoelastic fluid composition can be based on a boiling range associated with the hydrocarbon fluid. The boiling range for a hydrocarbon fluid can be characterized in any convenient manner One option for characterizing a boiling range can be based on an initial boiling point and a final boiling point (or end point or alternatively dry point).

Boiling ranges are determined according to a method based on ASTM D86. In the present invention, the hydrocarbon fluid has an initial boiling point of about 95° C. to about 280° C. and a final boiling point of about 100° C. to about 315° C.

In addition to initial and final boiling points, a hydrocarbon fluid can also be characterized based on the difference between a lower end of a boiling range, such as an initial boiling point and an upper end of a boiling range, such as a final boiling point or dry point. In various aspects of the present invention, a difference between a lower end of a boiling range (initial boiling point) and an upper end of a boiling range (dry point) is about 60° C. or less, preferably about 50° C. or less, and more preferably about 40° C. or less.

In one embodiment, the hydrocarbon fluid comprises less than about 50 wt % of isoparaffins relative to the weight of the hydrocarbon fluid, less than about 50 wt % of n-paraffins relative to the weight of the hydrocarbon fluid, and at least about 25 wt % of cycloparaffins relative to the weight of the hydrocarbon fluid. Preferably, the hydrocarbon fluid comprises about 20-30 wt % of isoparaffins relative to the weight of the hydrocarbon fluid, about 20-30 wt % of n-paraffins relative to the weight of the hydrocarbon fluid, and about 40-60 wt % of cycloparaffins relative to the weight of the hydrocarbon fluid. Ideally, the hydrocarbon fluid comprises about 24-26 wt % of isoparaffins relative to the weight of the hydrocarbon fluid, about 24-26 wt % of n-paraffins relative to the weight of the hydrocarbon fluid, and about 45-55 wt % of cycloparaffins relative to the weight of the hydrocarbon fluid. The initial boiling point of such hydrocarbon fluid is preferably about 160° C. to about 280° C., more preferably about 190° C. to about 250° C., and ideally about 205° C. to about 225° C. The final boiling point of such hydrocarbon fluid is preferably about 195° C. to about 315° C., more preferably about 210° C. to about 270° C., and ideally about 235° C. to about 260° C.

In another embodiment, the hydrocarbon fluid comprises at least about 50 wt % of isoparaffins relative to the weight of the hydrocarbon fluid, less than about 5 wt % of n-paraffins relative to the weight of the hydrocarbon fluid, and less than about 25 wt % of cycloparaffins relative to the weight of the hydrocarbon fluid. Preferably, the hydrocarbon fluid comprises about 80 wt % to about 99 wt % of isoparaffins relative to the weight of the hydrocarbon fluid and about 1 wt % to about 20 wt % of cycloparaffins relative to the weight of the hydrocarbon fluid. More preferably, the hydrocarbon fluid comprises about 82 wt % to about 90 wt % of isoparaffins relative to the weight of the hydrocarbon fluid and about 10 wt % to about 18 wt % of cycloparaffins relative to the weight of the hydrocarbon fluid. Ideally, the hydrocarbon fluid comprises about 85 wt % to about 95 wt % of isoparaffins relative to the weight of the hydrocarbon fluid and about 5 wt % to about 15 wt % of cycloparaffins relative to the weight of the hydrocarbon fluid. The initial boiling point of such hydrocarbon fluid is preferably about 95° C. to about 270° C., more preferably about 160° C. to about 230° C., even more preferably about 180° C. to about 230° C., and ideally about 190° C. to about 230° C. The final boiling point of such hydrocarbon fluid is preferably about 100° C. to about 310° C., more preferably about 170° C. to about 255° C., more preferably about 195° C. to about 255° C., and ideally about 205° C. to about 255° C.

In still another embodiment, the hydrocarbon fluid comprises at least about 50 wt % of n-paraffins relative to the weight of the hydrocarbon fluid or at least about 50 wt % of cycloparaffins relative to the weight of the hydrocarbon fluid.

Another feature for a hydrocarbon fluid for forming a viscoelastic fluid composition as described herein can be to have a reduced or minimized amount of aromatics in the hydrocarbon fluid. In the present invention, the hydrocarbon fluid has an aromatic content of about 20 wt % or less relative to the weight of the hydrocarbon fluid. In various aspects, the aromatic content of the hydrocarbon fluid can be about 3.0 wt % or less, or about 2.0 wt % or less, or about 1.0 wt % or less. Without being bound by any particular theory, a hydrocarbon fluid having a reduced or minimized content of aromatics can be beneficial for achieving non-Newtonian viscosity behavior in the viscoelastic fluid composition after addition of the suitable thickening agent. Additionally or alternately, the hydrocarbon fluid can also have a reduced or minimized content of unsaturated hydrocarbons, such as alkenes and/or alkynes. In various aspects, the hydrocarbon fluid can contain less than about 5 wt % of unsaturated hydrocarbons, or less than about 3 wt %, or less than about 2 wt %, or less than about 1 wt %. Hydrocarbons having limited amounts of unsaturation and/or aromatic content can often correspond to compounds that have low toxicity or other interaction with the environment. This can make such (substantially) saturated hydrocarbons suitable as solvents and/or suspension media for delivery of active ingredients in an agricultural setting.

Examples of suitable hydrocarbon fluids can include, but are not limited to, hydrocarbon fluids available from ExxonMobil Chemical Company, such as Exxsol™ and Escaid™ de-aromatized fluids and Isopar™ isoparaffinic fluids, optionally in combination with other hydrocarbon fluids to provide a combined hydrocarbon fluid having properties as described herein.

Thickening Agent

To form the viscoelastic fluid composition of the present invention, in particular a viscoelastic fluid composition non-Newtonian characteristics with respect to viscosity, the hydrocarbon fluid is combined with a thickening agent. In various aspects, the thickening agent is a block copolymer where at least one end block of the copolymer corresponds to an aromatic polymer, such as polystyrene. The other block(s) of the block copolymer preferably includes at least one block selected from aliphatic polymers. Suitable block copolymers include di-block copolymers, tri-block copolymers, radial polymers, star polymers, multi-block copolymers, and mixtures thereof having at least one end block corresponding to an aromatic polymer, preferably di- and tri-block copolymers having at least one end block corresponding to an aromatic polymer, such as polystyrene. Optionally, the copolymer can have only one end block corresponding to an aromatic polymer. More generally, a copolymer having an aromatic polymer block at one end of the polymer, with one or more additional blocks based on aliphatic polymer blocks, can also be suitable. The non-aromatic block(s) within the block copolymer can be based on vinyl monomers such as ethylene, propylene, butylene, other aliphatic monomers, and diene monomers such as butadiene or isoprene (2-methyl-1,3-butadiene), or a combination thereof. Suitable examples of the at least one aliphatic block include ethylene/propylene copolymers, ethylene/butadiene copolymers, polyisoprene, polybutadiene, ethylene/propylene/diene copolymers and the like. Suitable di-block copolymers include, but are not limited to, styrene-ethylene/propylene copolymers, styrene-ethylene/butadiene copolymers, styrene-isoprene copolymers, styrene-butadiene copolymers. Suitable triblock copolymers include, but are not limited to, styrene-ethylene/propylene-styrene copolymers, styrene-ethylene/butadiene-styrene copolymers, styrene-isoprene-styrene copolymers, and styrene-butadiene-styrene copolymers. Multi-block copolymers are similar to di- or tri-block copolymers, except that the multiple block copolymers include additional aromatic and/or aliphatic blocks. In addition to the linear chain structure, branched homopolymers or copolymers also may be used, such as radial polymers and star polymers. The above polymers may also be hydrogenated to reduce unsaturation before they are used as thickening agents. In various aspects, the at least one aromatic end block, for instance of the at least one styrene end block, in the block copolymer, can correspond to about 20 wt % to about 50 wt % of the weight of the copolymer, or about 30 wt % to about 40 wt %. In various aspects, the peak molecular weight of the block copolymer having at least one aromatic end block can be about 1,000 g/mol to about 1,000,000 g/mol, preferably about 10,000 g/mol to about 500,000 g/mol, more preferably about 30,000 g/mol to about 300,000 g/mol, and ideally about 50,000 g/mol to about 250,000 g/mol. Peak molecular weight as used herein means the molecular weight of the highest peak as determined by gel permeation chromatography (GPC). Examples of suitable di-block copolymers containing polystyrene as the aromatic polymer end block are available from Kraton® Polymers Group, such as Kraton® G linear di- and tri-block copolymers based on styrene and ethylene/propylene or ethylene/butylene, which includes Kraton® G1701 polymers, for instance Kraton® G1701 E, Kraton® G1701 H, Kraton® G1701 M, or Kraton® G1702 H polymers, Kraton® G1650, Kraton® G1651, Kraton® G1652 or Kraton® G1654 polymers; Kraton® D linear di- and tri-block copolymers based on styrene and butadiene, isoprene or butadiene/isoprene; and Kraton® FG linear tri-block copolymers based on styrene and ethylene/butadiene with maleic anhydride grafted onto the rubber midblock. Other suitable examples of commercially available block copolymers are copolymers sold under the trade name of Vector®, Septon® and Solprene®.

The amount of thickening agent added to the viscoelastic fluid composition can vary depending on the nature of the hydrocarbon fluid(s) in the composition but is typically about 1.0 wt % to about 10.0 wt %, preferably about 3.0 wt % to about 10.0 wt %, more preferably about 3.0 wt % to about 7.5 wt %, and ideally 3.5 wt % to about 7.0 wt %, relative to the weight of the hydrocarbon fluid.

Without being bound by any particular theory, it is believed that a thickening agent based on a block copolymer including at least one aromatic end block can allow a hydrocarbon fluid as defined herewith to have non-Newtonian behavior with respect to viscosity. When at least about 3.0 wt % %, relative to the weight of the hydrocarbon fluid, of said thickening agent with an aromatic end block is present in the hydrocarbon fluid, or at least about 3.0 wt %, or at least about 4.0 wt %, or at least about 5.0 wt %, the amount of the thickening agent can be sufficient to initiate non-Newtonian behavior. However, as the shear rate is increased, the mechanism(s) causing the non-Newtonian behavior can be disrupted, leading to a substantial reduction in viscosity.

Other Viscoelastic Fluid Composition and Oil Flowable or Oil Dispersion Composition Components In addition to the hydrocarbon fluid (or fluids) and the at least one thickening agent, the viscoelastic fluid composition of the present invention and the oil flowable or oil dispersion composition comprising the same can also contain various other components. As already mentioned, the viscoelastic fluid composition of the present invention can typically be combined with particles containing active ingredient(s), in particular pesticide active ingredient particles, to prepare oil flowable or oil dispersion compositions. Said oil flowable or oil dispersion composition for agricultural applications can for instance also optionally include water, one or more surfactants, one or more thickeners different from an aromatic block copolymer thickener, and/or any other components that may typically be found in a composition for delivering active ingredients (such as pesticides) in an agricultural application, for instance colorants such as pigments and dyes, adjuvant surfactants, pH and other chemical stabilizers, defoamers, perfumes, odor masks and further density-adjusting solvents. For additional components (additives) other than water and particles containing active ingredients, the amount of additives can be any convenient amount, such as from about 0.1 wt % to about 20 wt %, relative to the weight of the hydrocarbon fluid.

Suitable surfactants and surfactant dispersants for the agricultural oil flowable or oil dispersion composition include, but are not limited to, alkanolamides, alkylarylsulfonates, alkoxylated alcohols, alkoxylated alkylphenols, alkoxylated amines, alkoxylated amides, alkoxylated phenols, alkoxylated fatty acids, glycerol esters, phosphate esters, quaternary surfactants, soaps, sorbitan derivatives, sulfates of alcohols, sulfates of alkoxylated alcohols, sulfonates of dodecyl and tridecylbenzenes, sulfosuccinates and derivatives thereof, ethylene oxide-propylene oxide block copolymers, and other amphiphilic compounds. Mixtures or surfactants and/or surfactant dispersants may be used. It is noted that the surfactant can optionally be a surfactant suitable for use with a continuous oil phase, as opposed to a surfactant suitable for use with a continuous water phase.

With regard to water, prior to application of an active ingredient in an agricultural setting, water is added to the oil flowable or oil dispersion composition containing the particles of the pesticide active ingredient to form a diluted composition such as an emulsion. Such emulsion diluted composition most often contains from 1 wt % water to about 99 wt % of water, or 1 wt % to 99.95 wt %, relative to the total weight of the diluted composition. The diluted composition containing the additional water can then be sprayed or otherwise distributed so as to apply the active ingredient. In this type of diluted composition, the oil-based phase (including the hydrocarbon fluid or fluids) can remain as the continuous phase or can become an emulsified (discontinuous) phase.

For oil and gas applications, the viscoelastic fluid composition may be combined with water, one or more surfactants, one or more thickeners different from an aromatic block copolymer thickener, and/or any other components that may typically be found in a drilling mud, such weighting agents, filtration control agents, organophilic clays, lime for alkalinity control, and brine for activity control.

Making and Characterizing Viscoelastic Fluid Composition and Oil Flowable or Oil Dispersion Composition In various aspects of the present invention, the viscoelastic fluid composition including the hydrocarbon fluid or fluids and the thickening agent can be formed by mixing the hydrocarbon fluid and the thickening agent under suitable conditions. One consideration during mixing can be the mixing temperature. In various aspects, the temperature of the hydrocarbon fluid or fluids (and/or any other components already present) during mixing with the thickening agent is preferably about 50° C. to about 150° C., more preferably about 50° C. to about 100° C., and ideally about 55° C. to about 85° C. For some combinations of hydrocarbon fluid and thickening agent, increasing the mixing temperature can improve the clarity of the composition, so that a composition having a cloudy appearance at a lower mixing temperature can have a clear appearance at a higher mixing temperature. However, changing from a cloudy appearance to a clear appearance for a solution does not necessarily correlate with an improvement in the resulting properties of the composition. Regardless of the appearance of the solution, increasing the mixing temperature can improve the rheological properties of the composition for some combinations of hydrocarbon fluid and thickening agent; however, if mixing temperature becomes too high then the properties can begin to degrade.

With regard to mixing conditions, it is noted that safety considerations can also be a consideration when selecting a mixing temperature. For example, some commercially available hydrocarbon fluids can have a flash point that is less than 150° C., or less than 100° C. While a hydrocarbon fluid could be mixed with a thickening agent at a temperature greater than the flash point for the hydrocarbon fluid so long as appropriate safety precautions are taken, from a safety standpoint it is preferable to mix a hydrocarbon fluid with a thickening agent at a temperature that is below the flash point of the hydrocarbon fluid, and optionally below the flash point, if any, of the thickening agent and/or any other materials present during mixing.

The mixing performed at the mixing temperature can be performed under high shear conditions, such as a shear rate of at least about 100 $s^{-1}$. For example, a composition can be mixed in a commercial mixer at about 1000 to about 5000 RPM, such as about 2500 RPM. Depending on the configuration of a commercial mixer, such mixing speeds can correspond to a shear rate of up to about 1000 $s^{-1}$ or possibly more. The mixing can be performed for a convenient amount of time, such as about 1 minute to about 300 minutes, or about 5 minute to about 60 minutes, or about 10 minutes to about 45 minutes.

The resulting viscoelastic fluid composition containing at least the one or more hydrocarbon fluids and the thickening agent can have one or more desirable features. For instance, in some aspects, the viscoelastic fluid composition may have a kinematic viscosity greater than 20.5 $mm^2/s$ at 40° C. This is especially advantageous as said compositions are outside of the definition for either Category 1 or Category 2 aspiration toxicity as defined by the Globally Harmonized System of Classification and Labelling of Chemicals (GHS).

In some aspects, the viscoelastic fluid composition can have a yield stress of at least about 0.1 Pa to about 1,000 Pa, or about 0.1 Pa to about 100 Pa, or about 5 Pa to about 50 Pa, or about 10 $lb_f/100$ $ft^2$ to about 25 $lb_f/100$ $ft^2$. The yield stress is the stress level at which the material ceases to behave elastically or the applied stress that must be exceeded to make a structured fluid flow. The yield stress corresponds to the limiting value of the shear stress for the composition as the shear rate approaches zero and can be determined by generating a plot of the shear stress versus the shear rate relationship (such as that shown in FIG. 5) and extrapolating to zero shear rate.

In some aspects, at a shear rate of about 0.1 $s^{-1}$ or less, the viscoelastic fluid composition can have a dynamic viscosity of at least about 1000 cP at 25° C., or at least about 5000 cP, or at least about 10,000 cP, or at least about 50,000 cP, or at least about 100,000 cP, such as up to about 10,000,000 cP or more. Additionally or alternatively, at a shear rate of about 1.0 $s^{-1}$, the composition can have a dynamic viscosity of at least about 1000 cP at 25° C., or at least about 5000 cP, or at least about 10,000 cP, such as up to about 1,000,000 cP or more. In such aspects, the dynamic viscosity of the composition can optionally correspond to the above values at a range of temperatures. For example, the composition can optionally have a dynamic viscosity of at least about 1000 cP, or at least about 5000 cP, or at least about 10,000 cP, or at least about 50,000 cP, or at least about 100,000 cP at a shear rate of about 0.1 $s^{-1}$ (and/or about 1.0 $s^{-1}$) for temperatures ranging from about 0° C. to about 70° C., or about 25° C. to about 70° C., or about 25° C. to about 60° C.

In an especially preferred embodiment, the viscoelastic fluid composition can also have a reduced viscosity at higher shear rates. At a shear rate of at least about 10 $s^{-1}$, the viscosity at 25° C. can be at least about an order of magnitude lower than the corresponding viscosity at a shear rate of 0.1 $s^{-1}$, i.e. the viscosity at 25° C. at a shear rate of at least about 10 $s^{-1}$ is at least about ten times lower than the viscosity at 25° C. at a shear rate of 0.1 $s^{-1}$. Another option for characterizing reduced viscosity at higher shear rates can be based on viscosity (such as at 25° C. or 50° C.) at a shear rate of 100 $s^{-1}$. At a shear rate of 100 $s^{-1}$ and at 25° C., the viscosity of the viscoelastic fluid composition can be about 10 cP to about 5000 cP, or about 50 cP to about 5000 cP, or about 100 cP to about 5000 cP, or about 10 cP to about 2000 cP, or about 50 cP to about 2000 cP, or about 100 cP to about 2000 cP, or about 10 cP to about 1000 cP, or about 50 cP to about 1000 cP, or about 100 cP to about 1000 cP, or about 10 cP to about 800 cP, or about 50 cP to about 800 cP, or about 100 cP to about 800 cP.

The viscosity, yield stress, and thermal stability may be measured by a Dynamic Mechanical Analysis based method on a RheoStress RS6000 rheometer in the shear rate range of 0.001 $se^{c-1}$ to 1000 $se^{c-1}$. To determine the viscosity and yield stress of a composition, a Z20 cylindrical spindle with a 0.2±0.01% deflection is used. The shear rate is varied over the range of 0.001 $se^{c-1}$ to 1000 $se^{c-1}$ while the temperature is kept constant at 22° C. and measurements of the viscosity and/or yield stress are taken, recorded and reported by the machine. To determine the thermal stability of a composition, parallel plates with a 0.2±0.01% deflection at a frequency of 1 Hz are used. The shear rate is kept constant at about 6.283 $se^{c-1}$ (1 Hz) while the temperature is varied from 22° C. to 70° C. over 1600 seconds, equating to an average increase of 1.8° C. per minute, and measurements of the viscosity and/or yield stress are taken, recorded and reported by the machine. The viscosity may alternatively be measured by a Brookfield Digital Viscometer, Model DV-II according to the procedure specified in the manual for the machine.

The oil flowable or oil dispersion composition can be formed by any suitable method known in the art, by dispersing the pesticide active ingredient particles in the viscoelastic fluid composition of the present invention. Dispersing the pesticide active ingredient particles in the viscoelastic fluid composition is typically done by stirring or high shear mixing, with or without heating. Other suitable ingredients may be present in the viscoelastic fluid composition or may be added thereto before, at the same time or after the addition of the pesticide active ingredient particles, with or without heating.

The resulting oil flowable or oil dispersion composition can have one or more desirable features. For instance, in some aspects, the oil flowable or oil dispersion composition may have a kinematic viscosity greater than 20.5 $mm^2/s$ at 40° C. This is especially advantageous as said compositions are outside of the definition for either Category 1 or Category 2 aspiration toxicity as defined by the Globally Harmonized System of Classification and Labelling of Chemicals (GHS).

In some aspects, the oil flowable or oil dispersion composition can have a yield stress of at least about 0.1 Pa to about 1,000 Pa, or about 0.1 Pa to about 100 Pa, or about 5 Pa to about 50 Pa. The yield stress corresponds to the limiting value of the shear stress for the composition as the shear rate approaches zero.

In some aspects, at a shear rate of about 0.1 s$^{-1}$ or less, the oil flowable or oil dispersion composition can have a dynamic viscosity of at least about 1000 cP at 25° C., or at least about 5000 cP, or at least about 10,000 cP, or at least about 50,000 cP, or at least about 100,000 cP, such as up to about 10,000,000 cP or more. Additionally or alternately, at a shear rate of about 1.0 s$^{-1}$, the composition can have a dynamic viscosity of at least about 1000 cP at 25° C., or at least about 5000 cP, or at least about 10,000 cP, such as up to about 1,000,000 cP or more. In such aspects, the dynamic viscosity of the composition can optionally correspond to the above values at a range of temperatures. For example, the composition can optionally have a dynamic viscosity of at least about 1000 cP, or at least about 5000 cP, or at least about 10,000 cP, or at least about 50,000 cP, or at least about 100,000 cP at a shear rate of about 0.1 s$^{-1}$ (and/or about 1.0 s$^{-1}$) for temperatures ranging from about 0° C. to about 70° C., or from about 25° C. to about 70° C., or about 25° C. to about 60° C.

In an especially preferred embodiment, the viscoelastic oil flowable or oil dispersion composition can also have a reduced viscosity at higher shear rates. At a shear rate of at least about 10 s$^{-1}$, the viscosity at 25° C. can be at least about an order of magnitude lower than the corresponding viscosity at a shear rate of 0.1 s$^{-1}$, i.e. the viscosity at 25° C. at a shear rate of at least about 10 s$^{-1}$ is at least about ten times lower than the viscosity at 25° C. at a shear rate of 0.1 s$^{-1}$. Another option for characterizing reduced viscosity at higher shear rates can be based on viscosity (such as at 25° C. or 50° C.) at a shear rate of 100 s$^{-1}$. At a shear rate of 100 s$^{-1}$ and at 25° C., the viscosity of the oil flowable or oil dispersion composition can be about 10 cP to about 5000 cP, or about 50 cP to about 5000 cP, or about 100 cP to about 5000 cP, or about 10 cP to about 2000 cP, or about 50 cP to about 2000 cP, or about 100 cP to about 2000 cP, or about 10 cP to about 1000 cP, or about 50 cP to about 1000 cP, or about 100 cP to about 1000 cP, or about 10 cP to about 800 cP, or about 50 cP to about 800 cP, or about 100 cP to about 800 cP.

Example 1—Comparison of Thickening Agents

In this example, various potential thickening agents were mixed with Exxsol™ D80 hydrocarbon fluid, available from ExxonMobil Chemical Company. Exxsol™ D80 hydrocarbon fluid is a hydrotreated hydrocarbon fluid having a total paraffinic content of at least 99 wt %, an aromatic content of less than about 0.5 wt % (typically about 0.2 wt % or less), an isoparaffin content of less than about 30 wt %, a n-paraffin content of less than about 30 wt %, a cycloparaffin content of about 50 wt %, a distillation range of about 207° C. to about 237° C., a density of about 0.80 g/cc, and a kinematic viscosity at 25° C. of about 2.21 cSt.

The Exxsol™ D80 fluid was mixed with several types of thickening agents in various quantities. The thickening agents corresponded to several commercially available grades of polyisobutylene (either TPC Group (TPC 535 or TPC 1285) or BASF Oppanol® B15 or Oppanol® B50); an ethylene propylene diene rubber (Vistalon™ 785); and a block copolymer of polystyrene and ethylene/propylene (Kraton® G1701 M) that contained about 37 wt % polystyrene. The amount of thickening agent added to the Exxsol™ D80 fluid is shown in FIG. 1 for each thickening agent, along with an estimate of the average molecular weight for each thickening agent.

The mixing conditions used to form a substantially uniform composition were dependent on the thickening agent. All thickening agents were mixed at high shear at a mixing temperature of about 60° C. It is noted that the amount of heat that had to be provided to maintain the mixing temperature during the mixing process varied depending on the nature of the thickening agent. The period of mixing ranged from a few minutes for the TPC Group samples to up to two hours or more for the Oppanol® samples. The other thickening agents were mixed for about half an hour or less. The mixing temperatures and times were selected to produce a homogenous solution. Table 1 shows examples of the mixing details for each of the thickening agents shown in FIG. 1. For each thickening agent, the weight percent of the thickening agent dissolved under the mixing conditions is also indicated.

TABLE 1

Mixing Conditions for Thickening Agents in Exxsol ™ D80.

| | Kraton ® G1701 M (5%) | Vistalon ™ 785 (6%) | TPC 1285 (6%) | Oppanol ® B15 (6%) | Oppanol ® B50 (6%) |
|---|---|---|---|---|---|
| Estimated Dissolving time (minutes) | 20-30 | 10-15 | 0-2 | 30-45 | >120 |
| Mixing Temperature (° C.) | ~60 | ~60 | ~60 | ~60 | ~60 |
| Dissolving quality | Good Hazy | Slightly | Good | Good | Good |

As shown in FIG. 1, the neat hydrocarbon fluid had a viscosity of about 2 cSt regardless of the shear rate. The Vistalon™ 785 thickening agent at either 4 wt % or 6 wt % resulted in a substantial increase in the viscosity, but the increased viscosity was relatively constant at all measured shear rates. This corresponded to the expected behavior for a thickening agent.

The TPC Group polyisobutylenes (TPC 535 or TPC 1285) at 6 wt % appeared to provide only a minor amount of thickening effect. More thickening effect was observed for Oppanol® B15 and Oppanol® B50 polyisobutylenes at either 4 wt % or 6 wt %. As shown in FIG. 1, in addition to generally providing an increased viscosity, a further increase at low shear rates was shown for Oppanol® B15 and Oppanol® B50 polyisobutylenes at 4 wt %. However, the additional modest increases in viscosity at low shear rate appeared to, at best, lead to a viscosity of about 50 cP at a shear rate of 3.75 s$^{-1}$.

A substantially different type of viscosity behavior appeared to be present when the block copolymer containing a polystyrene end block was added to the hydrocarbon fluid. At both 4 wt % and 5 wt %, the Kraton® G1701 M thickening agent appeared to show order of magnitude increases in viscosity as the shear rate of the resulting fluid composition was reduced. This indicated an unexpected shear thinning behavior, corresponding to a viscoelastic composition, that is especially advantageous for use in a composition comprising suspended particles such as in an oil flowable or oil dispersion composition. Indeed, the high viscosity at low shear rates, such as at shear rates less than 10 s$^{-1}$, can allow particles to remain in suspension while the suspension is being stored. Shaking or stirring of the suspension can then be used to reduce the viscosity of the composition for pumping or other distribution means, optionally before or after addition of water, surfactants, and/or other potential components of the final formulation. All viscosity measurements shown in FIG. 1 were performed by a Brookfield viscometer according to the method described above.

The ability of a sample comprising 5 wt % of thickening agent according to the present invention to keep particles in suspension was tested as follows. In a first set of tests, about 7-10 g of copper (I) sulfate crystals ($Cu_2SO_4.5H_2O$, ranging in size from 0.1-3 mm) were added to 150-200 mL of a fluid corresponding to 95 wt % of the Exxsol™ D80 fluid and 5 wt % of the Kraton® G1701 M thickening agent. After 24 hours, the crystals appeared to remain in roughly the initial locations in the samples. After about 75 days, the crystals still remained substantially in place without settling. In a second set of tests, approximately the same amount of substantially identical copper (I) sulfate crystals were added to 150-200 mL of a fluid corresponding to 5 wt % Kraton® G1701 M thickening agent composition in Exxsol™ D80 fluid, and then the composition was shaken by hand. This resulted in the dispersion of the copper sulfate crystals through the fluid medium. After 75 days, the dispersed crystals appeared to remain substantially in place. Particles of pesticide active ingredients tend to generally lie in the about 1 µm to 15 µm size range. Thus, the results obtained with millimeter sized copper (I) sulfate crystals appear to demonstrate the ability of the present 5 wt % thickening agent composition to provide a stable suspension of active ingredient particles.

As an additional test for the 5 wt % thickening agent sample, two samples of the 5 wt % Kraton® G1701 M thickening agent composition in Exxsol™ D80 fluid were used for a pour test. One of the two samples was poured without prior shaking, while the second sample was shaken by hand and then poured at the same angle. The second sample that was poured shortly after shaking (and therefore exposed to high shear conditions) exhibited a substantially lower viscosity and, as a result, was more easily poured from one container to another. This demonstrates the utility of the 5 wt % thickening agent composition of the present invention for use as a non-aqueous concentrate of pesticide active ingredients when being pumped, sprayed, applied, or otherwise distributed after storage.

Example 2—Comparison of Hydrocarbon Fluids

In this example, about 5 wt % of Kraton® G1701 M thickening agent was added to various hydrocarbon fluids. In addition to the Exxsol™ D80 fluid described above, the thickening agent was also added to other Exxsol™ fluids having different boiling ranges, an isoparaffinic fluid, a n-paraffin based fluid, and an aromatic fluid. Additionally, mixtures of a polyalphaolefin with the Exxsol™ D80 fluid were prepared without a thickening agent. The isoparaffinic fluid was Isopar™ M, which is available from ExxonMobil Chemical Company. The Isopar™ M fluid had a total paraffinic content of at least 99 wt %, an isoparaffin content of at least about 85 wt %, with less than about 1 wt % aromatic content. The boiling range of the Isopar™ M fluid was about 227° C. to about 254° C., the density was about 0.79 g/cc at 15.6° C., and the kinematic viscosity was less than about 4 cSt at 25° C. The n-paraffin based fluid was Norpar™ 13, which was previously available from Exxon-Mobil Chemical Company. The Norpar™ 13 fluid had total paraffinic content of at least 98 wt %, a n-paraffin content of at least about 90 wt %, with less than about 1 wt % aromatic content. The boiling range of the Norpar™ 13 fluid was about 222° C. to about 242° C., the density was about 0.76 g/cc at 15.6° C., and the kinematic viscosity was less than about 2.5 cSt at 25° C. The aromatic fluid was Aromatic 200, which is available from ExxonMobil Chemical Company. The Aromatic 200 fluid had an aromatic content of greater than 95 wt % (i.e., substantially composed of aromatics). The boiling range of the Aromatic 200 fluid was about 234° C. to about 284° C., the density was about 1.0 g/cc at 15.6° C., and the kinematic viscosity was about 3 cSt at 25° C. The polyalphaolefin fluid ("PAO") was a metallocene PAO, available from ExxonMobil Chemical Company, with an initial boiling point of about 316° C., density of about 0.85 g/cc at 15.6° C., and kinematic viscosity of about 300 cSt at 100° C. Due to the higher viscosity of the polyalphaolefin fluid, tests were performed using hydrocarbon fluid mixtures corresponding to 80 wt % polyalphaolefin to 20 wt % Exxsol™ D80 fluid and 50 wt % polyalphaolefin to 50 wt % Exxsol™ D80 fluid. As noted above, the mixtures of polyalphaolefin fluid and Exxsol™ D80 fluid did not include a thickening agent.

Figure 2:
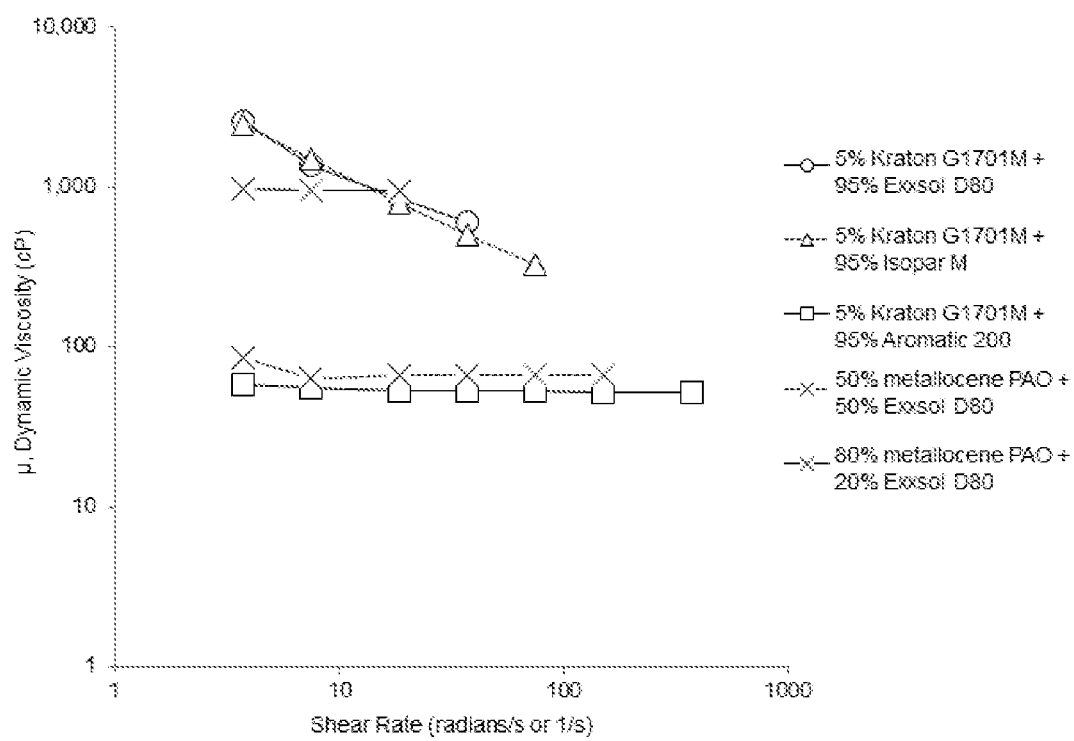
FIG. 2 shows viscosities as a function of shear rate for compositions containing various types of hydrocarbon fluids.

FIG. 2 shows the results from mixing 5 wt % of Kraton® G1701 M thickening agent with the various hydrocarbon fluids mentioned above. The sample based on the Isopar™ M fluid (isoparaffinic fluid) appeared to have analogous viscosity properties to the sample based on the Exxsol™ D80 fluid. The sample based on the Aromatic 200 fluid showed some thickening effect, but had a viscosity of less than 100 cP at all shear rates with no shear thinning effect, indicating that a viscoelastic composition was not formed. For the samples including the 4:1 ratio of polyalphaolefin to Exxsol™ D80 fluid, the viscosity was about 1000 cP, but without showing any shear-thinning behavior. Reducing the amount of polyalphaolefin to about 1:1 ratio also reduced the viscosity to below 100 cP. These results illustrate that the resulting fluid compositions comprising blends of paraffinic fluids with a thickening agent, such as Kraton® G1701 M achieved superior viscosity increase and shear-thinning behavior versus the other blends tested, suggesting that the best rheological behavior is obtained when a thickening agent as claimed is used with a de-aromatized aliphatic hydrocarbon. All viscosity measurements shown in FIG. 2 were performed by a Brookfield viscometer according to the method described above.

Figure 3:
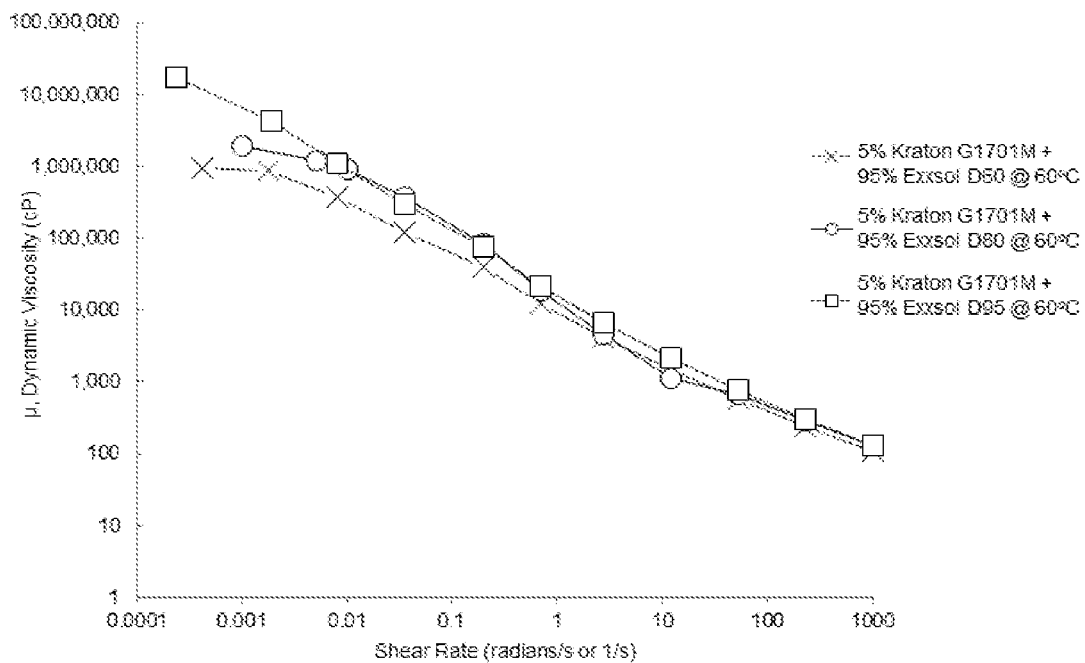
FIG. 3 shows viscosities as a function of shear rate for compositions containing hydrocarbon fluids having various boiling ranges.

FIG. 3 shows the results from mixing 5 wt % of such as Kraton® G1701 M thickening agent with three Exxsol™ D fluids having different molecular weights and boiling ranges. The Exxsol™ D60 fluid has a boiling range of about 190° C. to 211° C., while the Exxsol™ D95 fluid had a boiling range of about 225° C. to 256° C. Exxsol™ D60 and Exxsol™ D95 are hydrotreated hydrocarbon fluids having a total paraffinic content of at least 99 wt %, an isoparaffin content of less than about 50 wt %, and an aromatic content of less than about 0.5 wt %. As shown in FIG. 3, varying the boiling range (roughly proportional to molecular weight) of the hydrocarbon fluid did not have a strong impact on the viscosity versus shear behavior of the resulting fluid composition over most of the shear rate range studied. At very low shear rates, some difference in viscosity could be seen with lower molecular weight samples having lower viscosities than higher molecular weight samples. All viscosity measurements shown in FIG. 3 were performed by a RheoStress RS6000 rheometer according to the method described above.

Figure 4:
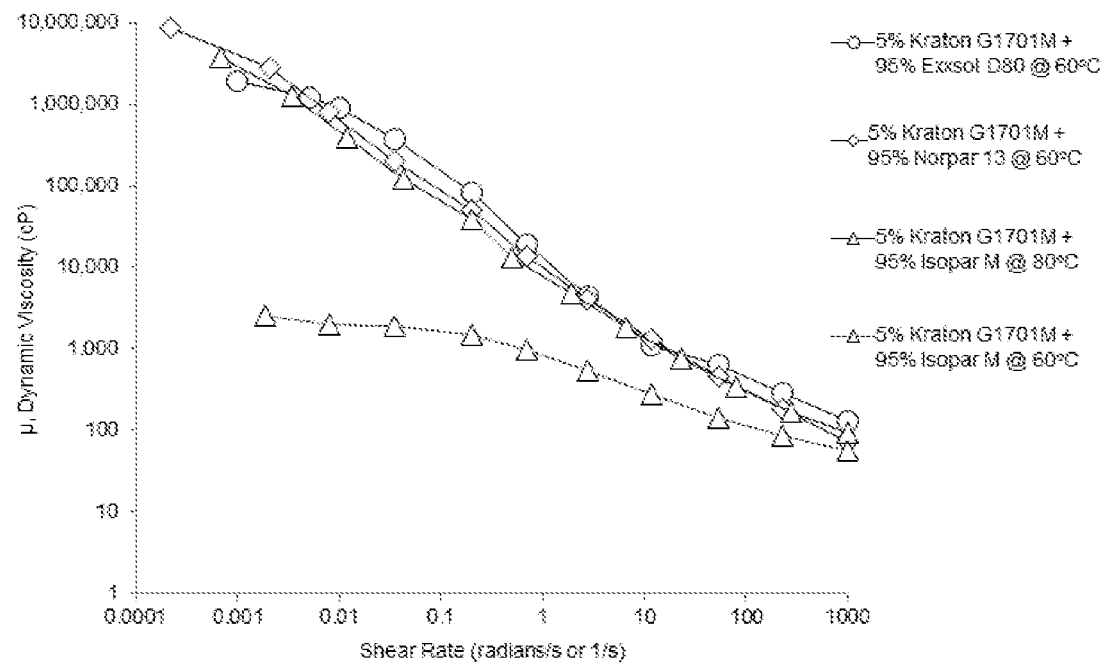
FIG. 4 shows viscosities as a function of shear rate for compositions containing various types of hydrocarbon fluids.

FIG. 4 shows the results from mixing 5 wt % of Kraton® G1701 M thickening agent with the Exxsol™ D80 fluid at a mixing temperature of about 60° C., with Norpar™ 13 fluid (n-paraffin based fluid) at a mixing temperature of about 60° C., and Isopar™ M fluid (isoparaffinic fluid) at mixing temperatures of about 60° C. and about 80° C. As shown in FIG. 4, the mixing temperature used when forming the isoparaffinic fluid appeared to have an impact on the properties of the resulting composition. In particular, mixing the isoparaffinic fluid and the thickening agent at 60° C. resulted in a composition with a lower viscosity profile having more similarities to a Newtonian fluid. However, mixing said isoparaffinic blend at 80° C. resulted in a viscosity versus shear rate profile similar to the other fluid blends tested. These results suggest that a fluid of mostly isoparaffinic structure requires mixing at a higher temperature to achieve a viscosity profile similar to other aliphatic structure types that contain only about 0-25 wt % isoparaffins. All viscosity measurements shown in FIG. 4 were performed by a RheoStress RS6000 rheometer according to the method described above.

Figure 5:
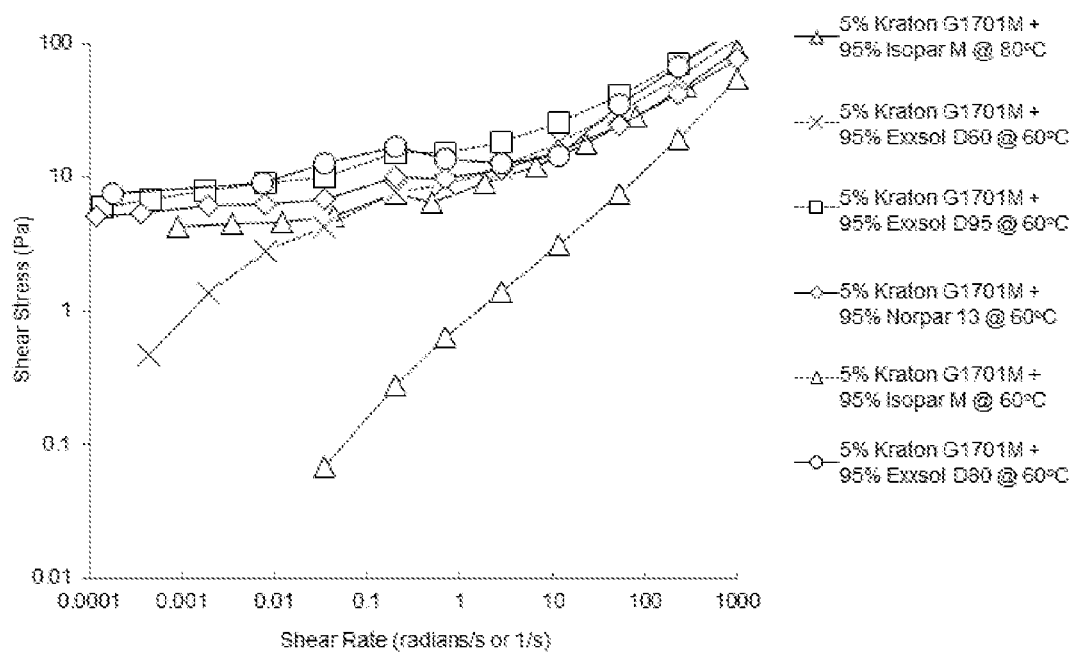
FIG. 5 shows yield stress values for compositions containing various types of hydrocarbon fluids.

FIG. 5 shows yield stress results for compositions based on 5 wt % of Kraton® G1701 M thickening agent and the fluids described in conjunction with FIGS. 3 and 4. As shown in FIG. 5, the compositions based on Exxsol™ D80 fluid, Exxsol™ D95 fluid, Isopar™ M fluid (mixed at 80° C.), and Norpar™ 13 fluid compositions all appeared to have yield stress values greater than about 2 Pa, indicating that the fluids were suitable for extended time storage, showing a stable suspension of micron sized particles. For the composition based on Isopar™ M fluid mixed at 60° C., the shear stress of the fluid appeared to decrease as the shear rate decreased, leading to a minimal yield stress value. Similarly, the fluid composition based on Exxsol™ D60 fluid, corresponding to the lowest molecular weight hydrocarbon fluid tested, also had a yield stress value approaching zero. This suggested that while the viscosities of the Isopar™ M based composition (mixed at 60° C.) and the Exxsol™ D60 fluid based composition are high enough to prevent rapid settling of the suspended particles, settling would likely occur over time. These results indicate that sufficiently high hydrocarbon fluid molecular weight and/or sufficiently high mixing temperature (depending on the aliphatic structure of the hydrocarbon fluid contemplated) are needed to achieve adequate yield stress for obtaining a stable suspension of micron size particles. All yield stress measurements shown in FIG. 5 were performed by a RheoStress RS6000 rheometer according to the method described above.

Figure 6:
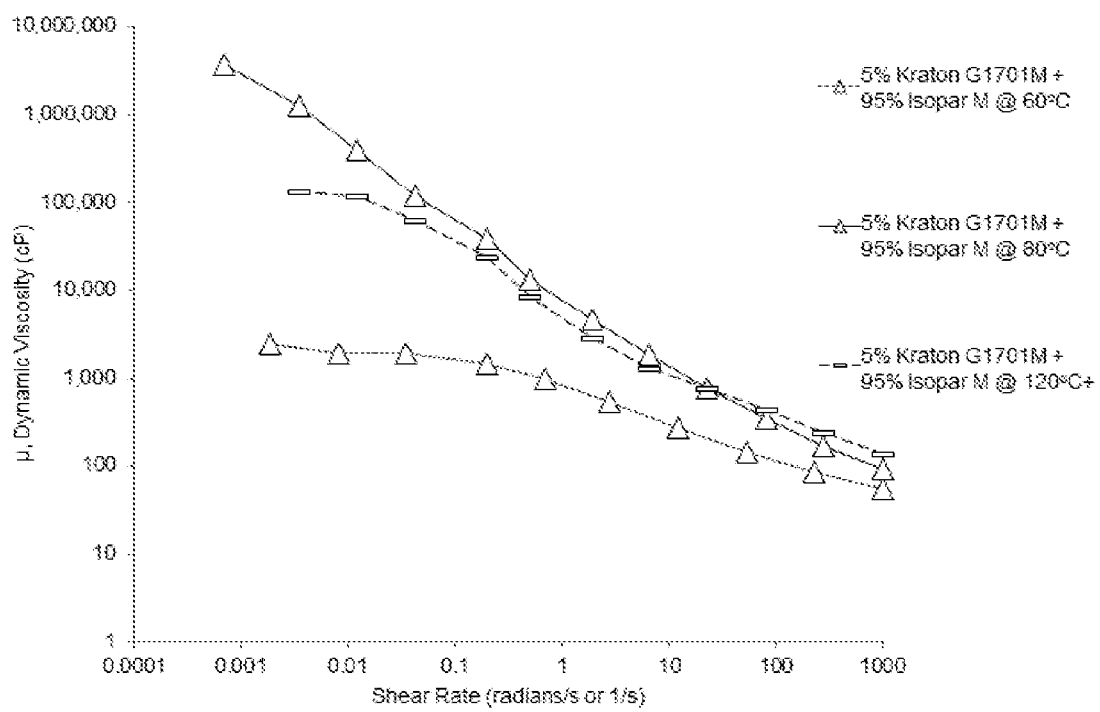
FIG. 6 shows viscosities as a function of shear rate for compositions containing isoparaffinic hydrocarbon fluids at various temperatures.

To further investigate the properties of fluid compositions based on hydrocarbon fluids with high isoparaffin content, compositions were formed containing 5 wt % of Kraton® G1701 M thickening agent and 95 wt % Isopar™ M fluid at three different mixing temperatures. The mixing temperatures were 60° C., 80° C., and 120° C.+. FIG. 6 shows the dynamic viscosity as a function of shear rate for the compositions formed at the three different mixing temperatures. As shown in FIG. 6, the viscosity properties of the compositions mixed at 80° C. and 120° C.+ were similar, except at the very low shear rate range where the sample mixed at 120° C.+ had lower viscosity, suggesting that rheological properties may degrade somewhat if mixing temperature becomes too high. FIG. 6 also suggests, without being bound by theory, that the composition formed by mixing at 60° C. may have not formed a sufficiently homogenous mixture and/or may not have fully solubilized the thickening agent, leading to a reduced amount of viscoelastic properties for the sample mixed at 60° C. All viscosity measurements shown in FIG. 6 were performed by a RheoStress RS6000 rheometer according to the method described above.

Example 3—Stability Testing

This example shows results from testing related to the stability of compositions containing 5 wt % of Kraton® G1701 M thickening agent and either Exxsol™ D80 fluid or Isopar™ M fluid (isoparaffinic fluid described in Example 2).

Figure 7:
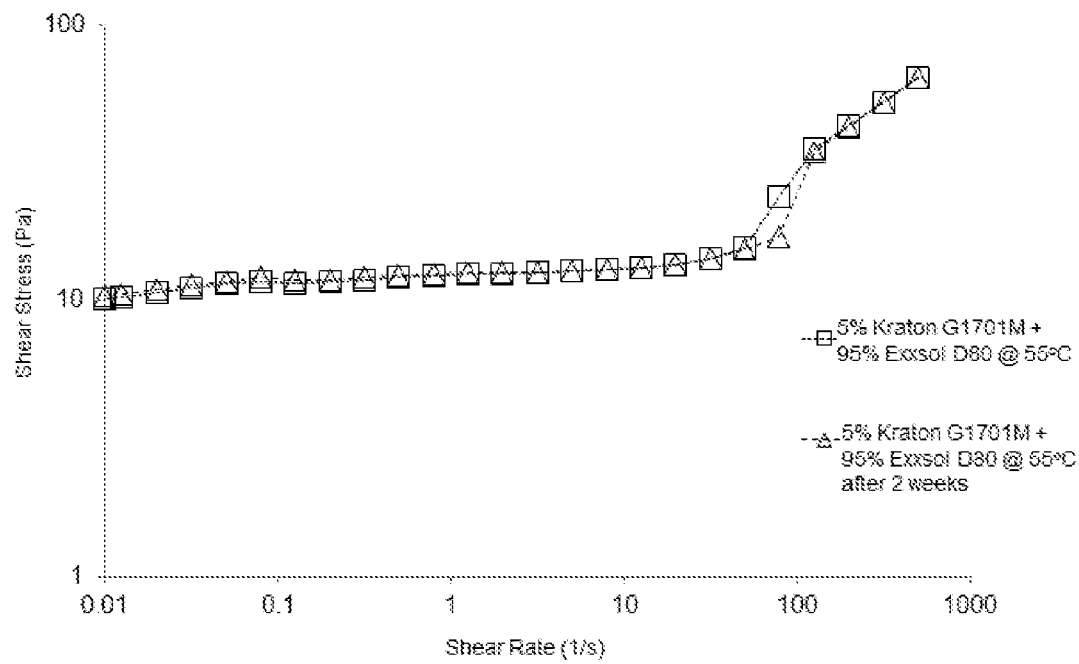
FIG. 7 shows thermal aging of a viscoelastic fluid composition.

FIG. 7 shows a thermal aging test for a composition containing Exxsol™ D80 fluid and 5 wt % of Kraton® G1701 M thickening agent. In FIG. 7, the shear stress versus shear rate is shown for the composition at a temperature of 55° C., either after initial formation or after two weeks of aging at a temperature of 55° C. This stability test corresponds to test MT 46.3, accelerated storage procedure, of CIPAC Handbook J (Analysis of Technical and Formulated Pesticides) that simulates the normal long-term aging of a liquid pesticide formulation by heating. As shown in FIG. 7, aging the composition at 55° C. for two weeks did not appear to have a substantial impact on the shear stress, as indicated by the similarity in shear stress values for the fresh and aged compositions at nearly all points during the test. The deviation where the fresh sample has a slightly higher shear stress than the aged sample is believed to be due to routine experimental variation and/or error. All viscosity measurements shown in FIG. 7 were performed by a RheoStress RS6000 rheometer according to the method described above.

Figure 8:
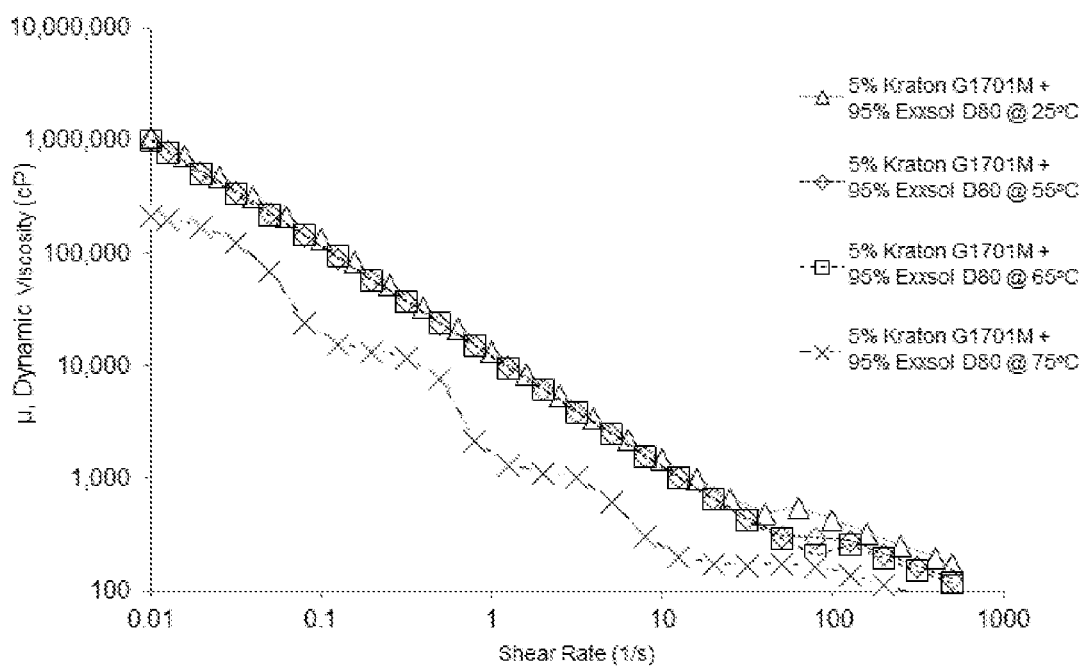
FIG. 8 shows viscosities as a function of shear rate and temperature for compositions.

FIG. 8 shows results from viscosity testing at various temperatures for a composition similar to the composition of FIG. 8. In FIG. 8, the viscosity of the composition versus shear rate was measured at temperatures of 25° C., 55° C., 65° C., and 75° C. As shown in FIG. 7, the viscosity of the composition is similar at temperatures of 25° C., 55° C., and 65° C. Without being bound by any particular theory, as the temperature is further increased to about 70° C. or higher, it is believed that increased temperatures can disrupt the structure of the thickening agent in the composition. This disruption in structure can lead to reduced viscosities, as shown for the sample at 75° C. in FIG. 8. However, as also shown in FIG. 8, the viscosity of the composition was greater than 100 cP at all shear rates for the four temperatures tested. All viscosity measurements shown in FIG. 8 were performed by a RheoStress RS6000 rheometer according to the method described above.

Example 4—Viscosity Verification and Aspiration Toxicity Characterization

One of the potential concerns for an oil flowable or oil dispersion composition can be that the composition may pose an aspiration toxicity hazard. Aspiration toxicity includes severe acute effects such as chemical pneumonia, varying degrees of pulmonary injury or death following aspiration. Aspiration is the entry of a liquid or solid directly through the oral or nasal cavity, or indirectly from vomiting, into the trachea and lower respiratory system. Some hydrocarbons (petroleum distillates) have been shown to pose an aspiration hazard in humans.

Substances and mixtures of this hazard class are assigned to one of two hazard categories of this hazard class on the basis of viscosity. Category 1, as defined by the Globally Harmonized System of Classification and Labelling of Chemicals (GHS), corresponds to substances that have been shown to pose an aspiration hazard in humans, and that are hydrocarbons that have a kinematic viscosity of less than 20.5 mm²/s at 40° C. (or 20.5 cSt as 1 mm²/s=1 cSt). Category 2, as defined by the Globally Harmonized System of Classification and Labelling of Chemicals (GHS), corresponds to substances that have been shown to pose an aspiration hazard in animals, that have a kinematic viscosity of 14 mm²/s or less at 40° C., and that have certain other surface tension, water solubility, and boiling point properties. Based on the category definitions, a substance or mixture with a kinematic viscosity greater than 20.5 mm²/s at 40° C. is outside of the definition for either Category 1 or Category 2 aspiration toxicity.

A fluid composition 97.5 wt % of Exxsol™ D80 fluid and 2.5 wt % of Kraton® G1701 M thickening agent was tested and the kinematic viscosity was about 35.75 mm²/s (35.75 cSt) at 40° C., demonstrating that the kinematic viscosity is greater than 20.5 cSt (mm²/s). The viscosity was determined by an Anton Paar SVM 3000 Stabinger viscometer via ASTM D7042.

A fluid composition containing 96 wt % of Isopar™ M fluid and 4 wt % of Kraton® G1701 M thickening agent was tested at a shear rate of 750 s⁻¹ and at a temperature of 60° C. Under the test conditions, the viscoelastic composition had a dynamic viscosity of about 31-32 cP. Based on the density of Isopar™ M fluid being less than 1 g/cm³, the corresponding kinematic viscosity was greater than 32 cSt (mm²/s). This kinematic viscosity value at 60° C. demonstrates that the kinematic viscosity at 40° C. would be greater than 20.5 cSt (mm²/s).

Fluid compositions containing 96 wt % of Exxsol™ D80 fluid and 4 wt % of Kraton® G1701 M thickening agent were tested under several conditions. At a shear rate of 375 s⁻¹ and a temperature of 65° C., the resulting dynamic viscosity was about 60 cP. At a shear rate of 500 s⁻¹ and a temperature of 65° C., the resulting dynamic viscosity was about 66.5 cP. At a shear rate of 375 s⁻¹ and a temperature of 55° C., the resulting dynamic viscosity was about 76.7 cP. Although there were some variation between the tests, the overall results demonstrate that the corresponding kinematic viscosity at 40° C. would be greater than 20.5 cSt (mm²/s).

Example 5—Suitability for Drilling Mud Applications

This example shows results from testing related to the suitability of compositions containing 5 wt % of Kraton® G1701 M thickening agent and either Escaid™ 110 fluid or Escaid™ 115 fluid (both commercially available from ExxonMobil Chemical Company). Escaid™ 110 fluid is a hydrotreated hydrocarbon fluid having a total paraffinic content of at least 99 wt %, an aromatic content of less than about 0.5 wt % (typically about 0.2 wt % or less), an isoparaffin content of less than about 30 wt %, a n-paraffin content of less than about 30 wt %, a cycloparaffin content of about 50 wt %, a distillation range of about 207° C. to about 237° C., a density of about 0.80 g/cc, and a kinematic viscosity at 25° C. of about 2.21 cSt. Escaid™ 115 fluid is a hydrotreated hydrocarbon fluid having a total paraffinic content of at least 99 wt %, an aromatic content of less than about 0.5 wt % (typically about 0.2 wt % or less), an isoparaffin content of less than about 30 wt %, a n-paraffin content of less than about 30 wt %, a cycloparaffin content of about 50 wt %, a distillation range of about 225° C. to about 256° C., a density of about 0.80 g/cc, and a kinematic viscosity at 25° C. of about 2.78 cSt.

Figure 9:
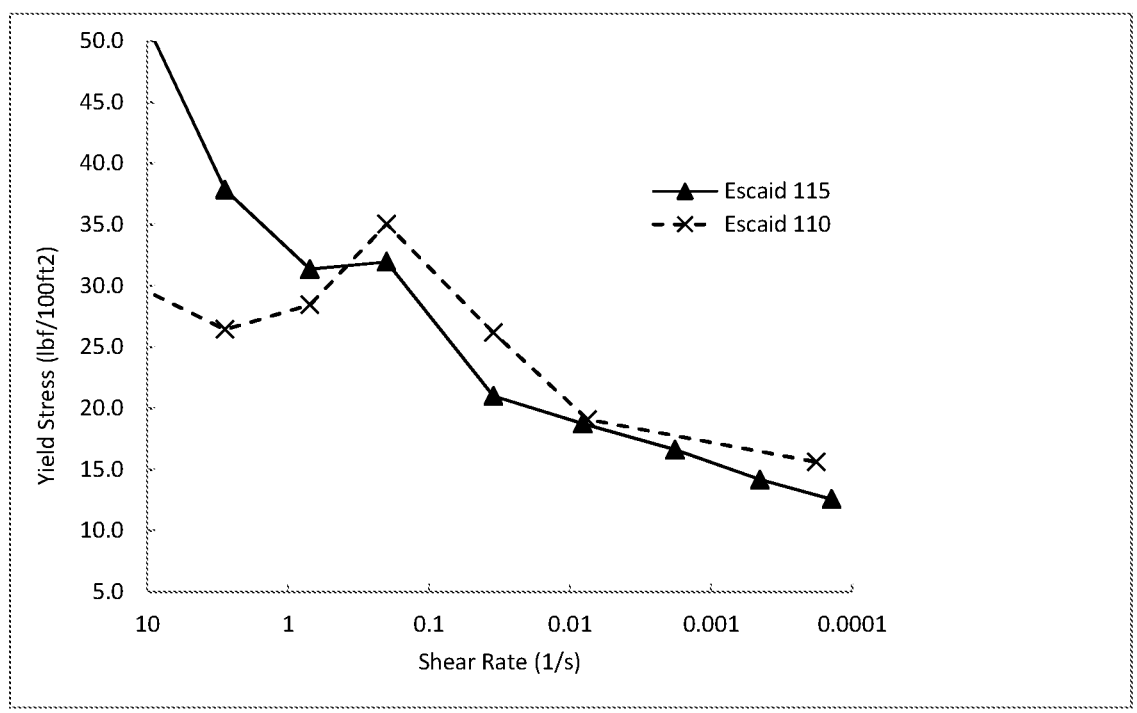
FIG. 9 shows shear stress as a function of shear rate.

For drilling mud applications, the viscoelastic fluid composition should have a yield point of about 10-25 lb$_f$/100 ft². FIG. 9 shows the yield stress for two inventive viscoelastic fluid compositions. The results show that either viscoelastic fluid composition is suitable for drilling mud applications as the Escaid™ 110 fluid+5 wt % of Kraton® G1701 M thickening agent has a yield point of about 15 lb$_f$/100 ft² and the Escaid™ 115 fluid+5 wt % of Kraton® G1701 M thickening agent has a yield point of about 12 lb$_f$/100 ft².

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The present invention has been described above with reference to numerous embodiments and specific examples. Many variations will suggest themselves to those skilled in this art in light of the above detailed description. All such obvious variations are within the full intended scope of the appended claims.

What is claimed is:

1. A viscoelastic fluid composition, comprising:
   (a) a hydrocarbon fluid having an isoparaffin content of about 80 wt % to about 99 wt % relative to the weight of the hydrocarbon fluid and about 1 wt % to about 20 wt % of cycloparaffins relative to the weight of the hydrocarbon fluid, the hydrocarbon fluid having an initial boiling point of about 95° C. to about 280° C. and a final boiling point of about 100° C. to about 315° C.; and
   (b) about 1.0 wt % to about 10.0 wt %, relative to the weight of the hydrocarbon fluid, of a thickening agent comprising a block copolymer having a peak molecular weight of about 10,000 g/mol to about 500,000 g/mol, wherein at least one end block of the block copolymer comprises an aromatic polymer and wherein the weight of said at least one end block is about 30 wt % to about 40 wt % of the block copolymer;
   wherein the thickening agent is mixed with the hydrocarbon fluid at a mixing temperature of about 80° C. to about 150° C. to form the composition and wherein the composition exhibits shear thinning.

2. The composition of claim 1, wherein the aromatic content of the hydrocarbon fluid is about 2.0 wt % or less.

3. The composition of claim 1, wherein the composition comprises about 3.5 wt % to about 7.0 wt % of the thickening agent.

4. The composition of claim 1, wherein the peak molecular weight of the block copolymer is about 50,000 g/mol to about 250,000 g/mol.

5. The composition of claim 1, wherein the aromatic polymer is polystyrene.

6. The composition of claim 1, wherein the block copolymer comprises only one end block comprising an aromatic polymer, preferably wherein the block copolymer is a di-block copolymer.

7. The composition of claim 1, wherein the block copolymer comprises at least one aliphatic polymer block, the at least one aliphatic polymer block comprising polyethylene, polypropylene, polybutylene, polyisobutylene, polybutadiene, a combination thereof, or a copolymer of at least two monomers selected from the group consisting of ethylene, propylene, butylene, isobutylene, and butadiene.

8. The composition of claim 1, wherein the difference between the initial boiling point and the final boiling point for the hydrocarbon fluid is about 50° C. or less.

9. The composition of claim 1, wherein the hydrocarbon fluid comprises a mixture of hydrocarbon fluids.

10. The composition of claim 1, wherein the composition further comprises one or more surfactants, one or more additional thickening agents, or a combination thereof.

11. The composition of claim 1, wherein the composition further comprises water, the amount of water being about 1 wt % to about 99.5 wt % by weight of the composition.

12. The composition of claim 1, wherein the composition further comprises a plurality of particles, the plurality of particles optionally comprising a pesticide active ingredient, the median size of the particles being about 0.1 µm to about 100 µm.

13. The composition of claim 1, wherein the composition has a kinematic viscosity of at least about 20.5 mm$^2$/s at 40° C.

14. An oil flowable or oil dispersion composition comprising the viscoelastic fluid composition of claim 1 and a solid particulate pesticide active ingredient.

15. The composition of claim 1, wherein the viscosity at 25° C. at a shear rate of at least about 10 s$^{-1}$ is about ten times lower than the viscosity at 25° C. at a shear rate of at least about 0.1 s$^{-1}$.

* * * * *